United States Patent

Pierce

[11] 4,062,608
[45] Dec. 13, 1977

[54] TELEPHONE HANDSET CORD STORAGE APPARATUS

[76] Inventor: Arthur Pierce, 89 Dafrack Drive, Lake Hiwaitha, N.J. 07034

[21] Appl. No.: 779,066

[22] Filed: Mar. 18, 1977

[51] Int. Cl.² ............................................. H01R 39/00
[52] U.S. Cl. .................. 339/5 RL; 179/155; 339/119 C
[58] Field of Search ............. 339/5 R, 5 RL, 5 S, 339/8 P, 8 PB, 8 RL, 119 C; 179/155

[56] References Cited

U.S. PATENT DOCUMENTS

| | | | |
|---|---|---|---|
| 1,247,672 | 11/1917 | Hallberg | 339/5 RL |
| 1,442,999 | 1/1923 | Boyle | 179/155 |
| 1,737,978 | 12/1929 | Sebell | 179/155 |
| 3,798,389 | 3/1974 | Tokizaki | 179/155 |

Primary Examiner—Roy Lake
Assistant Examiner—DeWalden W. Jones
Attorney, Agent, or Firm—Robert D. Farkas

[57] ABSTRACT

A telephone handset cord storage apparatus utilizes a housing containing a shaft journaled therein. The shaft carries a reel for the storage of portions of the length of a telephone cord in multi-turn solenoid-like layers. The shaft is biased in a preferred direction of rotation by a helical spring. A rod is slidably affixed to the housing and is adapted with an opening through which a portion of the cord passes. A crankshaft is pivotably affixed to the free end of the rod and eccentrically pivotably affixed to a gear rotatably operated when the shaft is rotated, thus winding and unwinding the cord in an orderly fashion within the storage area of the reel. Means are provided to fixedly secure the housing to a supporting surface adjacent a telephone apparatus.

1 Claim, 2 Drawing Figures

TELEPHONE HANDSET CORD STORAGE APPARATUS

BACKGROUND OF THE INVENTION

1. Field of the Invention

This invention relates to electrical cord storage devices and more particularly to that class wherein the electrical cord is wound and unwound in multi-turn layers within the storage area of a cord storage reel.

2. Description of the Prior Art

The prior art abounds with telephone cord reels. U.S. Pat. No. 3,798,389 issued on Mar. 19, 1974 to T. Tokizaki discloses a headphone having a reel for the internal storage of the cord. The cord is disbursed in random fashion within the storage area of the reel. Manual means are employed to rotate the reel so as to cause the cord to be dispensed from or stored within the reel. A contacting brush and rotor arrangement couples one end of the cord to the headphone.

U.S. Pat. No. 1,442,999 issued on Jan. 23, 1923 to R. B. Boyle teaches a telephone base having a reel rotatably journaled therein. The reel is adapted to store portions of a multiconductor electrical cable coupled to the telephone base in a spiral-like fashion. A spring biases the reel in a preferred direction so as to cause the cable to be wound within the confines of the reel when the cable is in a slack condition. Rotor-like conducting bands are rotatably coupled with the reel and, when used in conjunction with a plurality of stationary brushes, provide an electrical path for one end of the cable attached to the reel and the electrical components attached to the telephone base.

The Tokizaki disclosure suffers a deficiency in not disposing the cord in an orderly fashion within the reel as the reel is manually rotated so as to cause the cord to be stored therein. The Boyle invention describes a reel whose cord storage properties require the cord to be stored in non-solenoid fashion such that the amount of stored cord therein is limited to the length of cord that may be confined by a plurality of overlying turns, limited in number by the diameter of the reel.

SUMMARY OF THE INVENTION

A primary object of the present invention is to provide a telephone cord storage device which efficiently utilizes the storage capacity of a cord storage reel.

Another object is to provide a unique cord location distributing device which compactly locates the cord in multi-turn layers, disposed one above the other, within the confines of the storage reel.

Stil another object is to provide a telephone cord takeup apparatus which is suitable for use in accommodating cord extension between stationary or quasi-stationary telephone bases and the handset portions thereof.

Yet another object is to provide a telephone cord takeup apparatus in accordance with the preceding objects, which is simple in construction, relatively inexpensive and effective for its particular purposes.

Heretofore, telephone cord takeup reels were adapted to provide a storage space for a telephone cord connecting an entire telephone instrument to a telephone receptacle or connection box secured to a mounting surface. Such devices either wound the cord or cable in a reel, so as to describe a spiral pancake like storage path for the cord, or wound the cable in a reel in random fashion without neatly dispensing the cord in multi-turn layers extending outwardly from one another and outwardly from the cylindrical "core" of the reel. The present invention is a telephone cord takeup device which is utilized between the handset and the telephone base, thereby allowing the user to extend the handset and have the cord attached thereto dispensed outwardly from a compact housing which contains a cord takeup reel which has efficiently stored portions of the cord thereon. The present invention discloses a unique apparatus for disposing the cord onto the takeup reel so as to optimize the packing of the cord into the storage area of the reels.

These objects, as well as other objects of the present invention will become more readily apparent after reading the following description of the accompanying drawings.

DESCRIPTION OF THE PREFERRED EMBODIMENT

Figure 1:
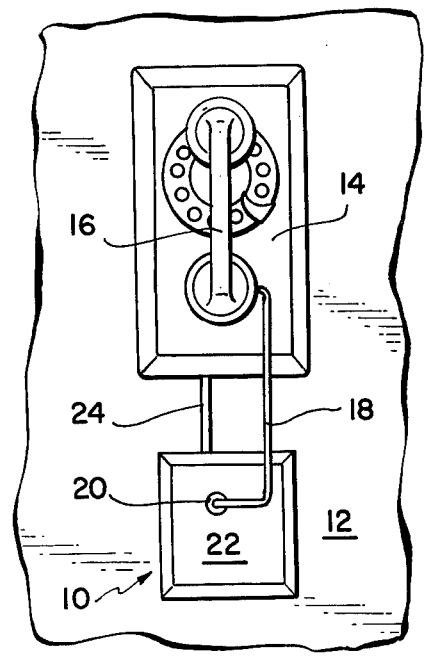
FIG. 1 is a plan view of the present invention shown attached to a telephone base and mounted on a supporting surface.

The structure and method of fabrication of the present invention is applicable to a housing having an open mouth portion and a base removably attached to the housing and covering the open mouth portion thereof. The base is provided with a plurality of holes through which screws or other fasteners pass to fasten the base to a supporting surface, adjacent the location of a telephone base. A first opening in the housing is utilized by the passage of a cable therethrough, connected at one end to a telephone base and at the other end to a plurality of stators secured within the housing. The handset of the telephone is provided with a telephone cord or cable which passes through another opening in the housing, an opening in a rod and thence over and onto a reel having a pair of annular-like parallel spaced apart plates. The individual conductors of the cable terminate on a plurality of annular shaped rotors disposed concentrically about a shaft carrying and co-axially aligned with the takeup reel. The rotors are in touching electrical engagement with the contacting brushes as the shaft, journaled within the housing, rotates by means yet undescribed. The rotors are carried by an insulating disc which in turn is secured to the shaft and rotates therewith.

The rod is slidably secured to the housing so as to permit the opening in the rod to move along a line parallel to the longitudinal axis of the shaft. One end of the rod is pivotably secured to one end of a crankshaft. The other end of the crankshaft is eccentrically pivotably secured to a pivot rod disposed parallel to and radially outwardly from the center of a first bevel gear. The first bevel gear is journaled within the housing such that the longitudinal axis of the bevel gear is substantially at right angles to the longitudinal axis of the shaft. A second bevel gear cooperates with the first bevel gear and is co-axially aligned with a first spur gear, being journaled to the housing. A second spur gear, carried by the shaft, cooperates with the first spur gear. A spring, in helical form, is disposed wrapped around a portion of the shaft. One end of the spring is secured to a portion of the takeup reel, preferably on the side plate immediately adjacent the location of the spring. The other end of the spring is secured to the housing. The spring tends to cause the reel to return to a normal rest position when the reel or portions of the hand held receiver cord wrapped thereon, are unrestrained. When the receiver is pulled away from the housing, the spring is tensioned in such a manner as to permit the shaft to be returned to its rest position when the cord, attached to the hand held receiver, is released. As the shaft rotates, the pair of spur gears and the pair of bevel gears rotate, causing the rod to oscillate along its path of movement such that the opening in the rod repeatedly traverses the distance separating the end plates of the takeup reel. The cord is thus caused to be dispensed into the takeup reel in abutting multi-turn relationship for each layer of turns of cord laid into the takeup reel. The opening in the rod is useful when the cord is being dispensed outwardly from the housing in the orderly unwrapping of the stored cord from the reel.

Now referring to the Figures, and more particularly to the embodiment illustrated in FIG. 1 showing the present invention 10 shown attached to a supporting surface 12 adjacent a telephone base 14. Handset 16 is shown having cord 18 attached thereto and passing through opening 20 in the housing 22. Cord 24 is shown communicating to the telephone base 14 and housing 22.

Figure 2:
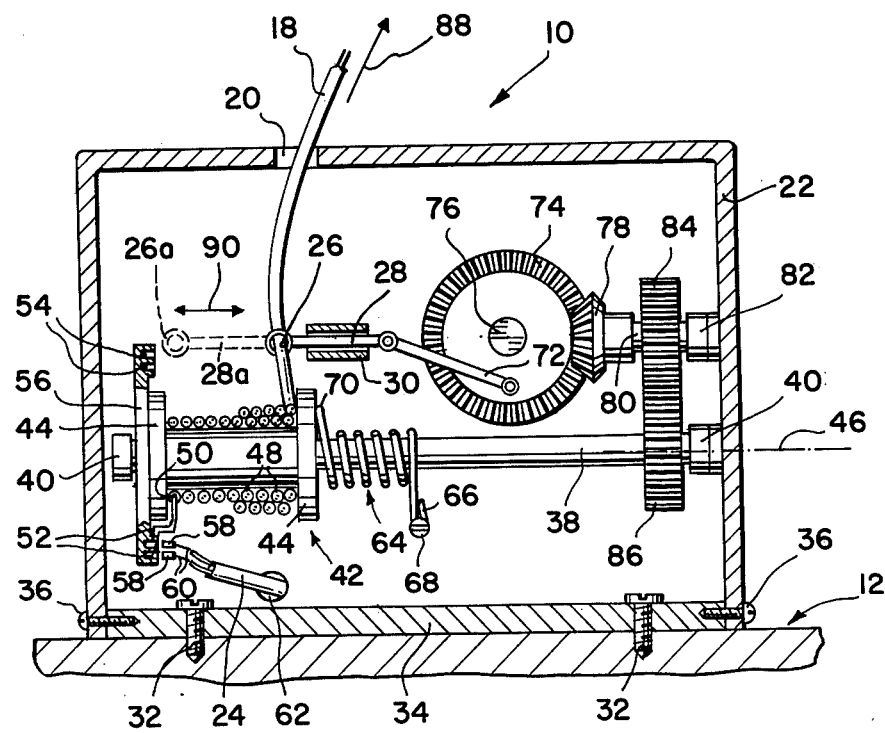
FIG. 2 is a side elevation view of the present invention shown attached to a supporting surface.

FIG. 2 shows cord 18 passing through opening 20 and opening 26 of rod 28. Sleeve bearing 30 slidably supports rod 28 within the confines of housing 22. Base 34 is shown fixedly secured to surface 12 utilizing screws 32 therefor. Housing 22 is secured to base 34 utilizing screws 36. Shaft 38 is journaled to housing 22 utilizing bearings 40. Takeup reel 42 is concentrically aligned with and attached to shaft 38, utilizing spaced apart plates 44 extending radially outwardly from the longitudinal axis 46 of shaft 38. Portions of cord 18 are wrapped in turns 48 onto takeup reel 42. The end of cord 18, herein designated by numeral 50, is separated into individual conductors 52, each electrically attached to individual rotor elements 54 secured to insulating disc 56. Rotors 54 are concentrically aligned with one another and co-axially aligned with longitudinal axis 46. Insulating disc 56 is secured to shaft 38 and extends radially outwardly therefrom. Stationary contact brushes 58 are mounted on housing 22 and electrically engage rotors 54. Wires 60 electrically couple brushes 58 to cable 24 which passes through opening 62 in housing 22.

Helical spring 64 is wound about shaft 38 having end 66 thereof fixedly secured to housing 22 utilizing screw 68 therefor. End 70 of spring 64 is secured to adjacent plate 44. Crankshaft 72 is pivotably secured to rod 28 and eccentrically pivotably secured to bevel gear 74. Bevel gear 74 rotates about axle 76 which is secured to housing 22. Bevel gear 78 engages bevel gear 74 and is secured to shaft 80 journaled in bearing 82 carried by housing 22. Spur gear 84 is secured to shaft 80 and co-axially aligned with bevel gear 78. Spur gear 86 is co-axially with and secured to shaft 38.

When cable 18 is withdrawn in the direction of arrow 88, the number of turns 48 are depleted during the process of forcibly rotating shaft 38, tensioning spring 64. Rod 28 is caused to oscillate in the directions of arrows 90 such that rod 28 will assume at an extreme position of travel the location depicted by dotted lines 28a. Opening 26 is thus translated along a path parallel to longitudinal axis 46, to an extreme position depicted by numeral 26a in exactly the opposite motion imparted to rod 28 when cable 18 is released and allowed to travel in a direction opposite to arrow 88. Turns 48 are shown in side by side touching engagement to one another in any layer of turns.

A primary advantage of the present invention is to provide a telephone cord storage device which efficiently utilizes the storage capacity of a cord storage reel.

Another advantage is to provide a unique cord location distributing device which compactly locates the cord in multi-turn layers, disposed one above the other, within the confines of the storage reel.

Still another advantage is to provide a telephone cord takeup apparatus which is suitable for use in accommodating cord extension between stationary or quasi-stationary telephone bases and the handset portions thereof.

Yet another advantage is to provide a telephone cord takeup apparatus in accordance with the preceding advantages, which is simple in construction, relatively inexpensive and effective for its particular purposes.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

I claim:

1. A telephone handset cord storage apparatus comprising a housing, means to secure said housing to a supporting surface, a shaft, a reel fixedly secured to said shaft, said reel having a pair of spaced apart plates extending radially outwardly from said shaft, said shaft journaled within said housing, means to rotatably bias said shaft in a preferred direction of rotation, said housing having an opening, a portion of the length of said cord passing through said opening, one end of said cord being electrically coupled to the handset of a telephone apparatus, said one end of said cord being adjacent said portion of the length of said cord, the other end of said cord being electrically coupled to a plurality of rotors, an insulating disc, said disc fixedly secured to said shaft and extending radially outwardly therefrom, said plurality of rotors fixedly secured to one lateral surface of said disc, said plurality of rotors located in concentric circular paths co-axially aligned with the longitudinal axis of said shaft, a plurality of contacting brushes, said plurality of brushes in touching electrical engagement with said plurality of rotors, said plurality of brushes electrically coupled to said telephone apparatus, a rod, said rod slidably secured to said housing, one end of said rod having an opening therein, said cord passing through said opening in said rod, the longitudinal axis of said rod being disposed parallel to and spaced apart from said longitudinal axis of said shaft, the other end of said rod pivotably affixed to one end of a crankshaft, the other end of said crankshaft pivotably eccentrically affixed to a first bevel gear, said first bevel gear journaled within said housing about a pivot axis, said pivot axis being at right angles to said longitudinal axis of said shaft, a second bevel gear rotatably coupled to said first bevel gear, said second bevel gear co-axially aligned with and fixedly secured to a first spur gear, a second spur gear coupled to said first spur gear, said second spur gear co-axially aligned with and fixedly secured to said shaft, wherein said another portion of the length of said cord is disposed in a plurality of multi-turn layers on said reel intermediate said pair of plates when said shaft is rotated in said preferred direction of rotation.

* * * * *